Sept. 11, 1923.  L. ROSEBUSH ET AL  1,467,881

DEMOUNTABLE RIM

Filed Feb. 17, 1921

Inventors
L. Rosebush and
F. I. Rosebush.

By Geo. P. Kimmel
Attorney

Patented Sept. 11, 1923.

1,467,881

UNITED STATES PATENT OFFICE.

LOUIS ROSEBUSH AND FRED J. ROSEBUSH, OF FLINT, MICHIGAN.

DEMOUNTABLE RIM.

Application filed February 17, 1921. Serial No. 445,678.

*To all whom it may concern:*

Be it known that we, LOUIS ROSEBUSH and FRED J. ROSEBUSH, citizens of the United States, residing at Flint, in the county of Genesee and State of Michigan, have invented certain new and useful Improvements in Demountable Rims, of which the following is a specification.

This invention relates to automobile rims and more particularly to that type of sectional rims for receiving a tire thereon to easily and expeditiously mount the same on the usual automobile wheel.

The primary object of the invention is directed to a sectional rim, having complementary, interlocking, flanged sections for resiliently receiving automobile tires thereon, and which may be easily put together or removed as desired in a comparatively short time and without possible injury to the inner tube of the tire.

Another object of the invention is directed to a sectional rim for receiving tires thereon and wherein the interfitting, interlocking sections of the rim are constructed and arranged to be slightly sprung apart so as to allow one section to be engaged with the other, provision being had for receiving the air valve in its proper position when the rim is placed on the wheel.

A still further object of the invention is directed to a sectional rim, having one of its sections split and adapted to be positioned over the air valve, so that the said split section may be slightly distorted by a tool when it is desired to remove the same from the wheel to replace a tire.

With these objects in view and others which will be manifest and suggested as the nature and purpose of our invention are revealed in the following specification and drawing, wherein we have shown a practical, yet preferred embodiment thereof, Figure 1 is a perspective view of the inner section of the rim showing the split portion for receiving the air valve.

Figure 1:
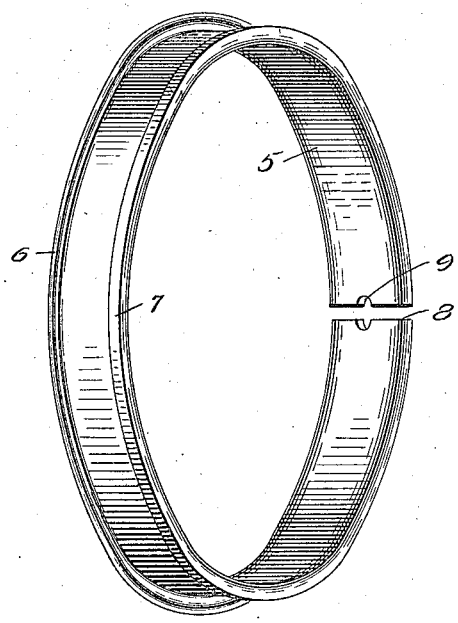
Figure 2:
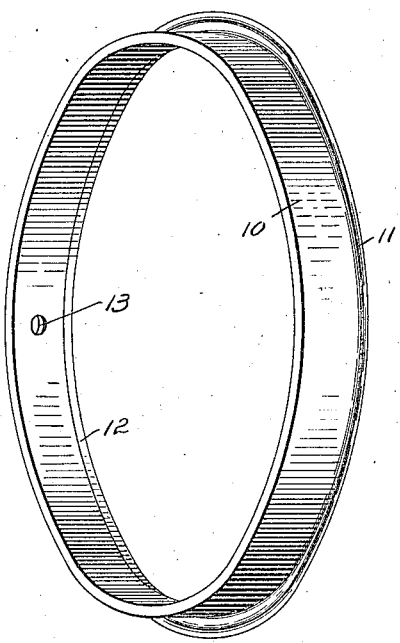
Fig. 2 is a perspective view showing the outer section.

Referring now in particular to the drawings, the rim primarily consists of an inner and an outer section adapted to interlock with each other for receiving an automobile tire and in a manner more specifically now set forth. The inner section is formed with an annular seat portion 5 provided at its outer side with an outwardly and upwardly extending inturned curved flange 6, which associates with a similar flange to be presently referred to on the outer section to retain the tire or casing of an automobile when the same is inflated. The seat portion formed by the inner section terminates at its inner side in an enlarged, vertical, annular rib 7 adapted for interlocking engagement in the manner subsequently to be described. The rib 7 is of greater width than the thickness of either of the sections of the rim. The inner section of the rim, is split as at 8, and each wall of the split is formed with a semi-circular notch and when these notches are shifted to register with each other an enlarged aperture 9 is provided which is adapted to register with the opening 13, of the outer section of the rim, and through said registering openings or apertures, is adapted to extend the air valve of the tire, when the latter is mounted on the outer section of the rim.

Figure 3:
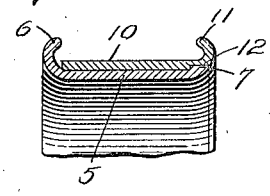
Fig. 3 is a section through the rim when assembled.
Figure 4:
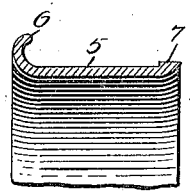
Fig. 4 is a section through Fig. 1.
Figure 5:
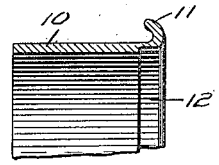
Fig. 5 is a similar section through Fig. 2.

The outer section of the rim is formed with an annular seat portion 10 provided at its inner side with an outwardly and upwardly projecting inturned curved flanged portion 11, which associates with the flange 6 for retaining the tire or casing on the rim, and is formed at its outer side with a channel or groove 12, beneath the curved flange 11, which cooperates and engages with the rib 7 for interlocking the respective sections, and particularly in the manner shown in Fig. 3 of the drawings. It will be thus seen that the flat seat portions of the rim overlie and interlock with each other so that after the tire has been placed on the rim the same will be held in position by the respective flanges 6, 11 as is well understood. The outer section 11 also is provided with an enlarged aperture 13 for receiving the air valve and of course, is adapted to register with the aperture 9 of the inner section.

The annular seat portion formed by the outer section of the rim extends from the flange on said outer section, to the flange formed on the inner section of the rim.

In actual use, it will be readily seen that the tire may be placed on the outer section or removed from the rim by simply prying the seat portion 5, at a point near the split 8, and as this distorts the inner section of the rim the same may be easily removed and the casing or tire replaced as desired. The rib 7 and channel 12 form a positive, interlocking means for the respective sections and prevent spreading of the same with respect to the casing or wheel.

In the accompanying drawings, we have illustrated our invention embodied in one form by way of example, and which in practice has been found to be highly satisfactory in obtaining the desired results. It will be obvious however that other embodiments may be adopted and that various changes in the detail of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described our invention, what we now claim as new and desire to secure by Letters Patent of the U. S. is:—

In a demountable rim an inner and an outer annular rim section each comprising an annular seat portion, one of said seat portions mounted on the other and adapted to have a tire mounted thereon, said inner seat portion having its outer side provided with an outwardly extending tire engaging flange and said outer seat portion having its inner side formed with an outwardly extending tire engaging flange, said inner seat portion having its outer face at that side opposite to the side with which the flange is formed provided with an annular rib, said outer seat portion having its lower face at that side opposite to that side with which the flange is formed provided with an annular groove for the reception of said rib to detachably couple said sections together, said rib flush with the flange on the outer seat portion, said outer seat portion extending from its flange to the flange on the inner seat portion, said inner seat portion being transversely split to allow distortions thereof when removing the tire, and said seat portions having registering means for the passage of an air valve.

In testimony whereof, we affix our signatures hereto.

LOUIS ROSEBUSH.
FRED J. ROSEBUSH.